US011463328B2

(12) United States Patent
Ranganathan et al.

(10) Patent No.: US 11,463,328 B2
(45) Date of Patent: Oct. 4, 2022

(54) TRAINING A MACHINE LEARNING ALGORITHM TO CREATE SURVEY QUESTIONS

(71) Applicant: Dell Products L. P., Round Rock, TX (US)

(72) Inventors: Karthik Ranganathan, Round Rock, TX (US); Sathish Kumar Bikumala, Round Rock, TX (US); Amit Sawhney, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 16/940,510

(22) Filed: Jul. 28, 2020

(65) Prior Publication Data

US 2022/0038350 A1 Feb. 3, 2022

(51) Int. Cl.
| H04L 12/24 | (2006.01) |
| H04L 41/5009 | (2022.01) |
| G06F 40/205 | (2020.01) |
| G10L 15/02 | (2006.01) |
| G06F 17/15 | (2006.01) |
| G06N 20/00 | (2019.01) |

(52) U.S. Cl.
CPC .......... *H04L 41/5009* (2013.01); *G06F 17/15* (2013.01); *G06F 40/205* (2020.01); *G06N 20/00* (2019.01); *G10L 15/02* (2013.01)

(58) Field of Classification Search
CPC ... H04L 41/5009; G06N 20/00; G06F 40/205; G06F 17/15; G10L 15/02
USPC ......................................................... 709/224
See application file for complete search history.

(56) References Cited

U.S. PATENT DOCUMENTS

| 2016/0266857 A1* | 9/2016 | Jun .......................... G10L 25/12 |
| 2019/0318370 A1* | 10/2019 | Kopikare .............. H04L 67/306 |
| 2020/0150752 A1* | 5/2020 | Kuntagod ................ G06K 9/03 |

* cited by examiner

*Primary Examiner* — Vivek Srivastava
*Assistant Examiner* — Sibte H Bukhari
(74) *Attorney, Agent, or Firm* — Krishnendu Gupta; Deepika Bhayana; Derek Lam

(57) ABSTRACT

In some examples, a server may determine that a case, created to address an issue of a computing device, is closed and perform an analysis of a communication session between a user and a technician and the steps taken by the technician to resolve the issue. Machine learning may be used on results of the analysis to predict potential pain points. For example, steps that take longer than average and during which particular words spoken by the user increase in pitch and/or volume may be predicted to be potential pain points. The machine learning may create questions for inclusion in a custom survey based on the potential pain points. The custom survey may be presented to the user. The answers may be correlated with the potential pain points to determine actual pain points in the steps taken to resolve the issue.

20 Claims, 8 Drawing Sheets

TRAINING A MACHINE LEARNING ALGORITHM TO CREATE SURVEY QUESTIONS

BACKGROUND OF THE INVENTION

Field of the Invention

This invention relates generally to computing devices and, more particularly to analyzing a communication session between a user and a support technician to identify potential "pain points" (e.g., events that cause user dissatisfaction) and creating a survey to determine with which of the potential pain points the user was actually dissatisfied.

Description of the Related Art

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Companies often conduct a survey after a user has interaction with an agent (e.g., salesperson, technical support specialist, or the like) of the company to determine user satisfaction (and dissatisfaction) with the interaction. However, the questions asked in the survey may be predetermined (e.g., generic) and may not always be relevant to the experience of the customer. For example, in a predetermined (e.g., standardized) survey, some questions may be applicable to the customer's experience, some questions may be inapplicable to a customer's experience, some questions may be partially applicable to the customer's experience, and the survey may not include some questions applicable to the customer's experience. Thus, a standardized survey may not provide meaningful feedback regarding the particular experience that individual customers go through when interacting with an agent (e.g., salesperson, technical support specialist, or the like) of the company.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may determine that a case, created to address an issue associated with a computing device, is closed and perform an analysis of (i) a communication session between a user and a technician and (ii) the steps taken by the technician to resolve the issue. Machine learning may be used on results of the analysis to predict potential pain points. For example, steps that take longer than average and during which particular words are emphasized by the user using an increase in pitch and/or volume may be predicted to be potential pain points. The machine learning may create questions for inclusion in a custom survey based on the potential pain points. The custom survey may be presented to the user. The answers to the custom survey may be correlated with the potential pain points to determine actual pain points in the steps taken to resolve the issue. The manufacturer of the computing device may address the actual pain points to improve the user experience when contacting technical support to resolve an issue.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
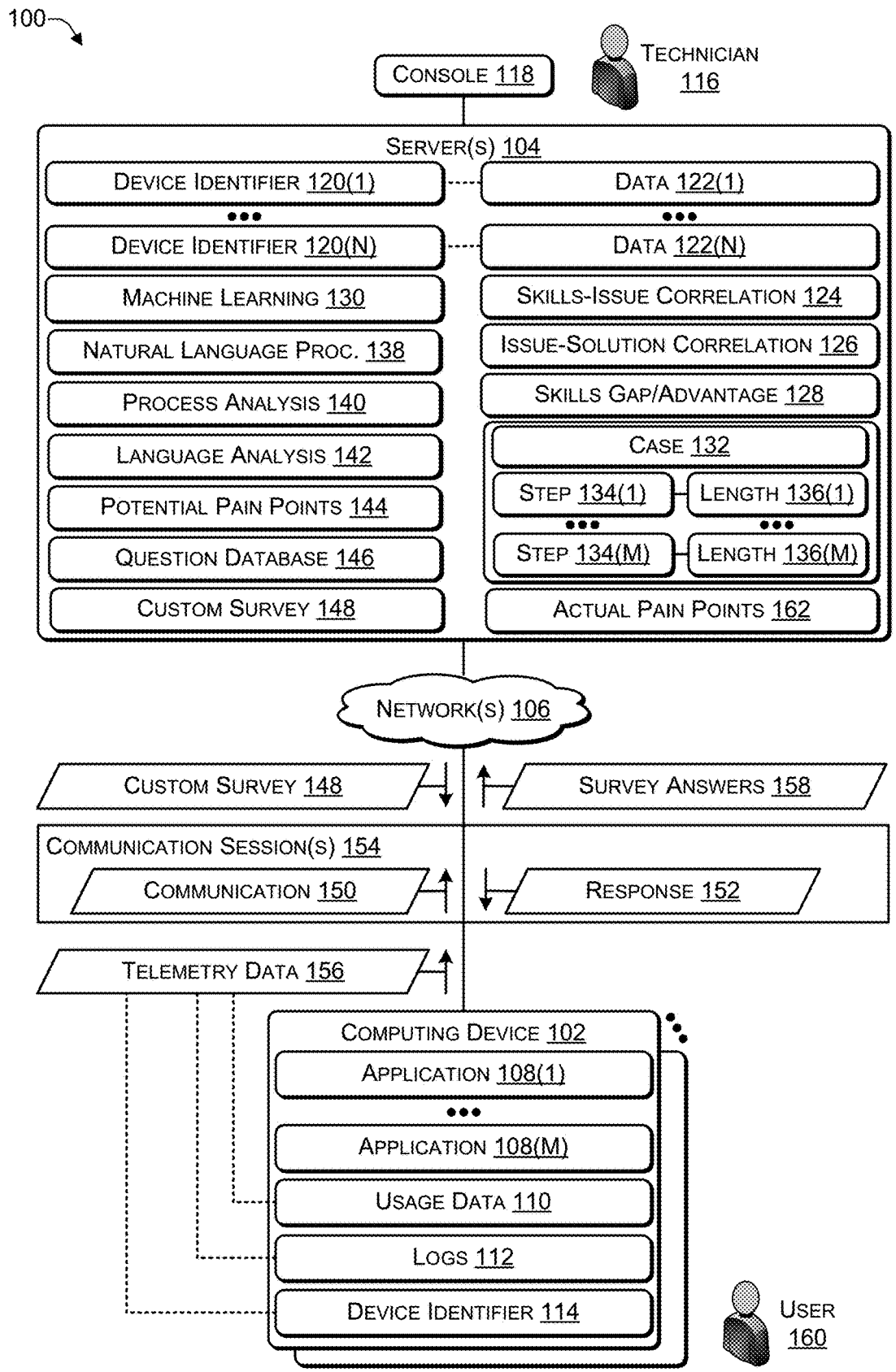
FIG. 1 is a block diagram of a system that includes a computing device initiating a communication session with a server, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

A computer manufacturer, such as, for example, Dell®, may provide technical support specialists (also referred to as service technicians or technicians) to resolve issues related to devices sold by the computer manufacturer. For example, after a user has purchased a computing device, the user may encounter an issue, such as a hardware issue, a software issue, or both. To resolve the issue, the user may contact (e.g., via email, chat, or a call), a technical support department of the manufacturer. The user may be assigned to a support technician tasked with resolving the issue. After the support technician has resolved the issue, the steps in the process used to resolve the issue may be analyzed using machine learning to predict potential pain points. A pain point may be a step or a sub-step that is abnormal, e.g., takes longer than average, involves more transfers than average, or the like. For example, in a particular step, a user may normally be transferred from one technician to another technician two or at most three times. If the user is transferred more than three times, then the particular step may be considered abnormal and therefore a potential pain point. As another example, in a particular step, a technician may normally take five minutes on average to obtain particular information about the user's computing device. If the technician takes more than five minutes, then the particular step may be considered abnormal and therefore a potential pain point.

After the potential pain points in the process to resolve the issue have been identified, the machine learning may create a survey, e.g., a custom survey that is customized for this user's particular issue and experience in resolving the particular issue, to verify whether the predicted potential pain points were in fact pain points for the user. For example, based on identifying the potential pain points, the survey questions may include questions asking the user whether the potential pain points were in fact pain points for the user, e.g., whether the user felt that the particular step took too long, whether the user was transferred to many times, or the like. To illustrate, the survey may include a question "Did you find the number of transfers between technicians to be excessive?", "Did you find that the technician took an excessive amount of time to determine the information about the computing device?", or the like. In this way, the survey can ask questions to determine whether the potential pain points are in fact actual pain points, e.g., whether the user found them to be pain points. For example, the user may respond to the questions and indicate that the user did not find the number of transfers between technicians to be excessive or the user did not find the amount of time that the technician used to determine the information about the computing device to be excessive, because the issue was ultimately resolved in a timely manner. In this example, the user's answers to the custom survey questions enable the manufacturer to identify and address steps (or sub-steps) that users find to be actual pain points and to identify steps (or sub-steps) that users do not consider to be pain points and that the manufacturer need not address. In this way, the manufacturer can perform meaningful modifications by addressing the steps (or sub-steps) in the process that users find to be actual pain points.

After a technician has resolved an issue, the server may correlate the solution to the issue and perform an analysis of the steps used in the process to resolve the issue, including performing a skills analysis of each step (or sub-step) in the process. Machine learning may be used to predict which of the technician's skills may be improved, e.g., the technician is taking more time than other technicians take, on average, to perform a particular step (or sub-step). Machine learning may be used to predict which of the technician's skills are above average, e.g., the technician is taking significantly less (e.g., less than a predetermined amount or percentage of) time than other technicians take, on average, to perform a particular step (or sub-step). Machine learning may be used to create a survey for the technician to obtain additional data regarding the skills to improve and the skills in which the technician is above average. For skills that the technician may improve, the technician may be provided with training to improve those skills, including, for example, having a second technician that is about average in those skills train the technician. For skills where the technician is above average, the survey may ask the technician what specific tips and tricks the technician use to perform the step in an above average manner. In some cases, the technician may be used to train other technicians to teach the specific techniques (e.g., tips and tricks) used to perform the step. In this way, technicians can be provided targeted training to improve skills where improvement may be possible. In addition, details on how a particular technician is able to complete a step and/or sub-step faster than average may be obtained and shared with other technicians. In some cases, a particular technician who is able to complete a step and/or sub-step faster than average may be asked to instruct other technicians on his techniques.

Thus, after a user calls technical support with an issue, is connected to a technician, and the technician resolves the issue, the steps and/or sub-steps involved in the process to resolve the issue may be analyzed. Machine learning may be used to identify potential pain points and a customized survey with custom questions may be created and presented to the user. Based on the user's answers, the manufacturer may determine which steps and/or sub-steps are actual pain points and address those without addressing potential pain points that are in fact not actual pain points for the user. In addition, the time taken to perform each step and/or sub-step as well as the actions performed in each step and/or sub-step may be analyzed to identify where the technician's skills may be improved and where the technician's skills are above average. This information may be used to provide the technician with training to improve the skills that may be improved and identify information as to how the technician was above average and disseminate that information to other technicians.

For example, a server may include one or more processors and one or more non-transitory computer-readable storage media to store instructions executable by the one or more processors to perform various operations. The server may be associated with a technical support group. The operations may include determining that a case, created to address an issue associated with a computing device, is closed. The operations may include performing a natural language processing analysis of a communication session between a user of the computing device and a technician. For example, the communication session between the user of the computing device and the technician may include one of: a video call, an audio call, or a chat session. The natural language processing analysis may include, based on determining that the communication session comprises a voice call or a video call, converting an audio portion of the communication session into text (e.g., speech-to-text). If the communication session is a chat session, or an exchange of emails, the text from the communication session may be gathered. The operations may include parsing the text corresponding to the communication session to determine parts of speech associated individual words in the text, performing stemming of the individual words in the text, performing lemmatization of the individual words in the text, performing disambiguation of the individual words in the text, determining, using the machine learning algorithm, at least one pain word, and determining, based on particular steps of the process in which the at least one pain word was spoken, at least one pain point. Based on determining that the communication session comprises a voice call or a video call, the operations may include extracting an audio portion of the communication session, performing a pitch analysis of a pitch associated with which each word is spoken in the audio portion of the communication session, performing a volume analysis of a volume at which each word is spoken in the audio portion of the communication session, determining, based at least in part on the pitch analysis and the volume analysis, at least one pain word, and determining, based on particular steps of the process in which the at least one pain word was spoken, at least one pain point. The operations may include performing a process analysis of a process used to close the case. The operations may include determining a length of time corresponding to individual steps in the process used to close the case. The operations may include determining, using a machine learning algorithm and based at least in part on the natural language processing analysis, the process analysis, and the length of time corresponding to the individual steps, potential pain points associated with the communication session. A potential pain point may be any step (or sub-step) in the process used to close the case that may cause the user to experience "pain" and cause customer dissatisfaction. For example, a step that takes longer than average, a step in which the user is transferred multiple times between technicians, or the like may be potential pain points. The operations may include creating one or more questions to include in a custom survey and presenting the custom survey to the user. For example, creating the one or more questions to include in the custom survey may include determining that a survey database includes a particular question associated with a particular potential pain point of the potential pain points, retrieving the particular question from the survey database, modifying the particular question based at least in part on the process used to close the case to create a modified question, and including the modified question in the custom survey. As another example, creating the one or more questions to include in the custom survey may include determining that the survey database does not include the particular question associated with the particular potential pain point of the potential pain points, creating the particular question based at least in part on the particular potential pain point, adding the particular question to the survey database, and including the particular question in the custom survey. Presenting the custom survey to the user may include either (i) presenting a web-based survey to the user or (ii) presenting an interactive voice response (IVR) based survey to the user. The operations may include receiving user answers to individual questions of the one or more questions in the custom survey. The operations may include correlating the user answers with the potential paint points to determine actual pain points associated with the communication session. For example, the survey may determine that a potential pain point, such as a step taking longer than average or the user being transferred multiple times between technicians, is not an actual pain point for the user because the step led to the issue being quickly resolved. The operations may include determining one or more techniques to address at least one of the actual pain points. For example, if a technician is taking too long to complete a particular step (or sub-step), then the technician may be provided additional training. As another example, if a particular step results in a user being transferred too many times between technicians, the entire process may be revamped, the responsibilities of the different technicians (e.g., first level technician, second level technician, and the like) may be broadened, a case may be automatically escalated to higher priority, or any combination thereof, to reduce the number of transfers. The machine learning algorithm may be retrained based at least in part on (i) the potential pain points associated with the communication session and (ii) the actual pain points associated with the communication session.

The operations may include performing a skills analysis of the technician including: (i) determining a skills gap set of steps in the process to close the case, wherein each step in the skills gap set of steps took an above average amount of time to perform and is one of the actual pain points and (ii) determining a skills advantage set of steps in the process to close the case, wherein each step in the skills advantage set of steps took a below average amount of time to perform and is not one of the actual pain points. The average amount of time may be determined based on averaging the time taken by each of multiple technicians associated with the manufacturer of the computing device to complete each step in the process to close a case. The operations may include scheduling training for the technician to address the skills gap set. The operations may include creating a custom technician survey based at least in part on the skills advantage set of steps, determining, based on the technician's response to the custom technician survey, a particular technique that the technician used to perform at least one particular step in the skills advantage set of steps, and sharing the particular technique with other technicians to enable the other technicians to perform the at least one particular step in the below average amount of time. For example, if a technician is able to perform a particular step faster than average (e.g., faster by at least a predetermined percentage, such as 10%, 15%, 20% or the like), then the survey may ask the technician to identify the "tips and tricks", e.g., the techniques the technician uses to perform the particular step faster than average and these techniques may be shared with other technicians.

FIG. 1 is a block diagram of a system 100 that includes a computing device initiating a communication session with a server, according to some embodiments. The system 100 may include multiple computing devices, such as a representative computing device 102, coupled to one or more servers 104 via one or more networks 106.

The computing device 102 may be a server, a desktop, a laptop, a tablet, a 2-in-1 device (e.g., a tablet can be detached from a base that includes a keyboard and used independently of the base), a smart phone, or the like. The computing device 102 may include multiple applications, such as a software application 108(1) to a software application 108 (M). The software applications 108 may include an operating system, device drivers, as well as software applications, such as, for example a productivity suite, a presentation creation application, a drawing application, a photo editing application, or the like. The computing device 102 may gather usage data 110 associated with a usage of the applications 108, such as, for example, which hardware components each application uses, an amount of time each hardware component is used by each application, an amount of computing resources consumed by each application in a particular period of time, and other usage related information associated with the applications 108. The computing device 102 may gather logs 112 associated with the applications 108, such as installation logs, restart logs, memory dumps as a result of an application crash, error logs, and other information created by the applications 108 when the applications 108 and counter a hardware issue or a software issue. The device identifier 114 may be an identifier that uniquely identifies the computing device 102 from other computing devices. For example, the device identifier 114 may be a serial number, a service tag, a media access control (MAC) address, or another type of unique identifier. The computing device 102 may periodically or in response to a predefined set of events occurring within a predetermined period of time send telemetry data 156 to the server 104, where the telemetry data 156 includes the usage data 110, the logs 112, and the device identifier 114. For example, the predefined set of events occurring within a predetermined period of time may include a number of restarts (e.g., X restarts, where X>0) of an operating system occurring within a predetermined period of time (e.g., Y minutes, where Y>0), a number (e.g., X) of application error logs or restart logs occurring within a predetermined period of time (e.g., Y), or the like.

The server 104 may include one or more servers that execute multiple applications across the multiple servers and behave as a single server. Multiple technicians, such as a representative technician 116 (e.g., a technical support specialist), may access the server 104 via one or more consoles, such as a representative console 118.

The server 104 may store the telemetry data 156 in a database in which a device identifier 120 is associated with data 122. For example, a device identifier 120(1) may be associated with data 122(1) and a device identifier 120(N) may be associated with data 122(N). In this example, the device identifier 114 may be one of the device identifiers 120(1) to (N). The data 122 may include historical (e.g., previously received) telemetry data, historical (e.g., previously received) service requests (e.g., previous cases associated with the computing device 102), warranty data, and other related data.

The server 104 may include one or more machine learning algorithms, such as a representative machine learning 130. The machine learning 130 may include one or more types of supervised learning, such as, for example, Support Vector Machines (SVM), linear regression, logistic regression, naive Bayes, linear discriminant analysis, decision trees, k-nearest neighbor algorithm, Neural Networks such as Multilayer perceptron or similarity learning, or the like.

A user 160 may be associated with and use the computing device 102. When the user 160 encounters an issue with the computing device 102, the user may initiate a communication 150 to the server 104 and be routed to the technician 116. The technician 116 may provide a response 152 to the communication 150 thereby creating a communication session 154 in which the user 160 sends one or more communications (such as the representative communication 150) to the technician 116 and the technician 116 provides one or more responses (such as the representative response 152).

In response to the user 160 initiating the communication 150, the technician 116 may create a case 132 (also referred to as a trouble ticket or a ticket) associated with the issue. The technician 116 may perform a series of steps 134, such as a step 134(1) to a step 134(M) (M>0) to resolve the issue and close the case 132. Each of the steps 134 may include zero or more sub-steps, as explained further in FIG. 2. Each step 134 may have a corresponding length 136 indicating how much time was spent on each step 134. For example, the step 134(1) may have a length 136(1) and the step 134(M) may have a length 136(M).

After the case 132 has been closed (e.g., the issue has been resolved), the machine learning 130 may perform an analysis of the steps 134 associated with the case 132. For example, the steps 134 may include steps (and sub-steps) taken by the technician 116 to resolve the issue and close the case 132.

The communication session 154 may be in the form of voice communication (e.g., phone call, voice over internet protocol (VoIP) call, or the like), video communication (e.g., Skype®, Zoom®, Facetime®, or the like), chat communication (e.g., ZenDesk or the like), email communication, another type of communication, or any combination thereof.

The server 104 may perform natural language processing 138 of the communication session 154. The natural language processing 138 may identify words that the user 160 uses to describe the issue. For example, an audio portion of the communication session 154 may be converted into text (e.g., using speech-to-text). If the communication session is in the form of a chat session, email exchange, or other text-based communication, then the text associated with the communication session may be gathered. The text parsed to determine parts of speech (e.g., noun, verb, adverb, adjective, and the like), stemming (e.g., reducing inflected or derived words to their root form) of the individual words in the text, lemmatization (e.g., removing inflectional endings to determine base dictionary form of a word, also known as a lemma) of the individual words in the text, performing disambiguation (e.g., when a word has more than one meaning, determining a particular meaning which makes the most sense based on context) of the individual words in the text, and other natural language processing techniques.

The server 104 may perform process analysis 140 on the steps 134 that are part of the process used by the technician 116 to resolve the issue and close the case 132. The process analysis 140 may identify which particular steps of the steps 134 took longer (e.g., more than a predetermined amount or a predetermined percentage) than average (e.g., an average time based on multiple technicians performing each of the particular steps) and which particular steps of the steps 134 took less (e.g., less than a predetermined amount or a predetermined percentage) than average. The server 104 may perform language analysis 142 on the communication session 154. For example, the language analysis 142 may include identifying particular words used by the user 160, an emphasis of particular words used by the user 160, a pitch of particular words used by the user 160, a volume of particular words used by the user 160, and other language-related information associated with the communication 150 provided by the user 160. The language analysis 142 may be used to identify potential pain points 144 for the user 160 during the process to resolve the case 132. For example, the user 160 may indicate one of the potential pain points 144 (e.g., one of the steps 134 or one or more sub-steps) by using a particular word or phrase (e.g., a four letter word or other curse word, such as "darn", "crap", a phrase such as "too long", "too many", "too time consuming", "too convoluted", or the like), saying the particular word or phrase at a higher pitch compared to other words, saying the particular word or phrase at a higher volume compared to other words, providing another form of emphasis to the particular word or phrase, or any combination thereof.

The machine learning 130 may use the results of the natural language processing 138, the process analysis 140 and the language analysis 142 to predict the potential pain points 144 (e.g., one or more of the steps 134) that occurred during the resolution of the case 132. For example, the machine learning 130 may predict that particular steps of the steps 134 are the potential pain points 144 based on correlating the results of (i) the natural language processing 138, (ii) the process analysis 140, and (iii) the language analysis 142.

The server 104 may create a custom survey 148 based on the potential pain points 144 predicted by the machine learning 130. If the server 104 has previously created survey questions associated with one or more of the potential pain points 144, then the server 104 may retrieve the previously created survey questions from a question database 146. In some cases, the server 104 may retrieve one or more previously created survey questions from the question database 146 and modify at least one of the previously created survey questions for inclusion in the custom survey 148. The purpose of the custom survey 148 may be to confirm, with the user, whether the potential pain points 144 predicted by the machine learning 130 were experienced as pain points by the user 160 during the process to resolve the case 132. For example, the process analysis 140 may identify that in one of the steps 134, the user 160 was transferred from one technician to another technician multiple times, and predict that the multiple transfers may be one of the potential pain points 144. In this example, the custom survey 148 may include a question asking if the user 160 experienced the multiple transfers as a pain point to determine whether that particular step of the steps 134 was experienced as a pain point.

The custom survey 148 may be presented to the user 160 using (i) a web-based survey (e.g., hypertext markup language (HTML), extended markup language (XML), or similar), (ii) an interactive voice response (IVR) system that uses voice prompts provide the custom survey 148 and voice recognition to receive the survey answers 158, or another type of survey system. The survey answers 158 may be correlated with the potential pain points 144 to determine actual pain points 162. The actual pain points 162 may be those of the potential pain points 144 that the user 160 confirmed, based on the survey answers 158 to the custom survey 148, as being actual pain points. For example, the user 160 may not consider being transferred at least five times from one technician to another a pain point because the transfers were relatively quick and enabled the case 130 to be resolved quickly. As another example, the user 160 may confirm, based on the survey answers 158 to the custom survey 148, that a particular troubleshooting step 134 that took longer than normal (e.g., the corresponding length 136, compared to the average, was greater than a predetermined amount), that was identified as one of the potential pain points 144, was one of the actual pain points 162. In this way, the manufacturer of the computing device 102 can identify the potential pain points 144 and confirm, using the custom survey 148, which of the potential pain points 144 are the actual pain points 162 and address the actual pain points 162 rather than addressing one or more of the potential pain points 144 that are not one of the actual pain points 162.

The machine learning 130, the natural language processing 138, the process analysis 140, and the language analysis 142 may be used to identify skills of the technician 116 that are either below average (e.g., indicating a gap in skills) or above average (e.g., indicating skills that the technician 116 can share with other technicians). For example, the process analysis 140 may analyze the steps 134 and the corresponding length of each step 136 along with the actual pain points 162 to determine where there is a skills gap (e.g., below average skills) for the technician 116 and where the technician 116 has above average skills that can be used to train other technicians. For example, the machine learning 130, they use the natural language processing 138, the process analysis 140, the language analysis 142, and the actual pain points 162 to determine a skills-issue correlation 124, an issue-solution correlation 126, and identify a skills gap/skills advantage 128. The skills-issue correlation 124 may correlate the skills demonstrated by the technician 116 during the steps 134 involved in resolving the issue associated with the case 132. The issue-solution correlation 126 may correlate the issue of the case 132 with the solution used by the technician 116 to address the case 132. The skills gap/advantage 128 may identify which skills the technician 116 has a skills gap to enable the manufacturer of the computing device 102 to provide the technician 116 with additional training to address the particular skills gap. For example, if the solution was to upgrade a device driver to a current device driver, the technician 116 may be provided with additional training on device drivers and how to troubleshoot device driver issues to address the skills gap. The skills gap for the technician 116 may be identified by determining which of the steps 134 took more time (e.g., greater than a predetermined amount or a predetermined percentage) to resolve as compared to the average time (e.g., averaged over multiple technicians) to resolve each of the steps 134. The actual pain points 162 may also be taken into account to identify which of the steps 134 may indicate a skills gap for the technician 116. In some cases, the actual pain points 162 may be coordinated with the steps 134 and the length of each of the steps 136. For example, if the technician 116 spends more time (e.g., greater than a predetermined amount or a predetermined percentage) than average on a particular step of the steps 134 and the particular step is identified as one of the actual pain points 162, then the particular step is likely to indicate an area (e.g., skills gap) where the technician 116 can benefit from additional training. The skills gap/advantage 128 may identify skills for which the technician 116 has a skills advantage. For example, if the technician 116 spends less time (e.g., less than a predetermined amount or a predetermined percentage) than average on a particular step of the steps 134 and the particular step is not identified as one of the actual pain points 162, then the particular step is likely to indicate where the technician 116 has a skill advantage. In such cases, the technician 116 may be asked to provide information as to how the technician 116 was able to spend less time than average on the particular step. For example, the technician 116 may have developed a shortcut to troubleshoot a particular issue. By identifying that the technician 116 is able to troubleshoot the particular issue in a shorter than average period of time, the technician may be asked to share the shortcut or other tips and tricks used by the technician 116 to spend less time than average on the particular step.

In some cases, the machine learning 130 may create a custom survey 148 for the technician 116 based on one or more of the natural language processing 138, the process analysis 140, the language analysis 142, the actual pain points 162, and the steps 134 along with the corresponding lengths 136. The custom survey 148 for the technician 116 may ask questions to determine whether the technician 116 has a skills gap. The custom survey 148 may include one or more questions associated with one or more of the steps 134 that had an associated length 136 that was greater than average, was identified as one of the actual pain points 162 (by the user 160), or both, indicating a possible skills gap. For example, the custom survey 148 may ask why the technician 116 performed a particular set of actions associated with a particular step of the steps 134. Based on the technician's response, the machine learning 130 may identify a skills gap and determine how to address the skills gap. For example, the skills gap may be determined by providing the technician 116 with additional training, have another technician who is skilled in that area tutor or train the technician 116, or the like. The custom survey 148 may include one or more questions associated with one or more of the steps 134 that had an associated length 136 that was less than average, was not identified as one of the actual pain points 162, or both, indicating a possible skills advantage. For example, the custom survey 148 may ask which particular set of actions the technician performed at a particular step of the steps 134 to enable the technician 116 to quickly complete the particular step and why the technician 116 performed the particular set of actions. In this way, this custom survey 148 may identify shortcuts or other faster ways of performing a step (e.g., a tip, a trick, or other technique) that the technician 116 uses to quickly complete the particular step. These faster ways of performing the particular step may be shared with other technicians to improve the time other technicians spend to complete the particular step. For example, the faster ways of performing the particular step may be incorporated into a training course, the technician 116 may be asked to train other technicians, or the like.

The machine learning 130 may be periodically retrained using the actual pain points 162, the skills-issue correlation 124, the issue-solution correlation 126, the skills gap/advantage 128, or any combination thereof. For example, after a case, such as the representative case 132, has been closed and the results of the custom survey 148 received, the results of the custom survey 148, the actual pain points 162, the skills-issue correlation 124, the issue-solution correlation 126, and the skills gap/advantage 128, or any combination thereof, may be used to retrain the machine learning 130 to improve an accuracy of the machine learning 130.

Thus, when a user discovers an issue with the computing device, the user may contact a support department of the manufacturer of the computing device and be placed in contact with a technician. The user and the technician may participate in a communication session in which the technician obtains information from the user regarding the issue and performs one or more actions (e.g., install a software update, install a driver update, install a BIOS update, install an operating system update, install a firmware update, install another type of update, or any combination thereof) to the computing device to resolve the issue and close the case. For example, the technician may remotely connect to the computing device to perform the one or more actions. After the case has been closed, the communication session may be analyzed using machine learning to identify potential pain points, e.g., one or more steps (or sub-steps) that may have caused the user to become annoyed, frustrated, or experience another negative emotion. In some cases, the potential pain points may be cross-referenced with the length of time ("length") taken by the technician to perform each step (or sub-step) in closing the case. Machine learning may be used to create questions in a custom survey to determine whether the predicted potential pain points are actual pain points for the user. For example, even though a particular step may take longer than an average, the user may not consider the extra time taken to perform the particular step to be a pain point because the extra time taken to perform the particular step may have resulted in the issue being resolved more quickly. If a user indicates that a potential pain point is in fact an actual pain point, then the manufacturer may take steps to address the actual pain point by, such as, for example, providing additional training to the technician, improving the diagnostics of the computing device, improving the hardware of the computing device to avoid the issue, or the like. The machine learning may analyze the steps taken by the technician to resolve the issue and close the case and determine whether the technician has a skills gap that causes the technician to perform a particular step more slowly than other technicians (on average). The machine learning may analyze the steps taken by the technician to resolve the issue and close the case and determine whether the technician has a skills advantage that enables the technician to perform a particular step faster than other technicians (on average). The machine learning may create questions to include in a custom survey to the technician. The custom survey to the technician may determine more information about actual pain points regarding what particular actions the technician took to perform a particular step (e.g., that was identified as a pain point) and why the technician took those particular actions. The technician's answers to these questions may be used to provide the technician with additional training and the like to address the skill gap. The custom survey to the technician may determine more information about what particular actions the technician took to perform a particular step faster than other technicians (on average) and why the technician took the particular actions. The response to these questions may be used by the manufacturer to train other technicians to perform the particular step faster. In this way, machine learning may be used to analyze how a case was closed and create a custom survey for a user to identify and address actual pain points to reduce the number and severity of pain points experienced by users when calling technical support. The machine learning may be used to analyze how the case was closed and create a custom survey for the technician that closed the case to determine whether the technician has any skill gaps that can be addressed and to determine whether the technician has any faster way of performing a particular step that can be shared with the other technicians to improve the speed at which the particular step is performed.

Figure 2:
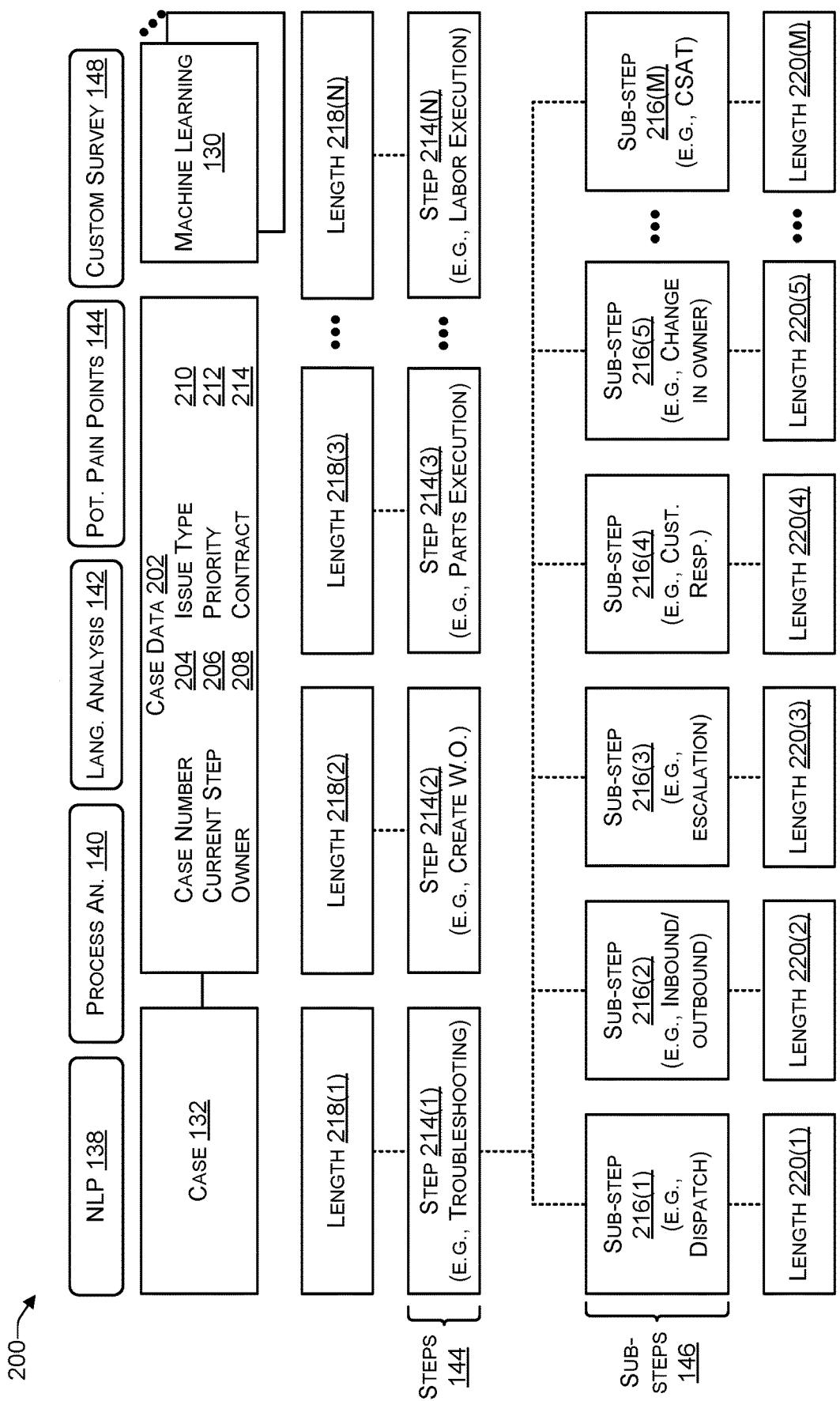
FIG. 2 is a block diagram of a case that includes steps and sub-steps associated with closing the case, according to some embodiments.

FIG. 2 is a block diagram 200 of a case that includes steps and sub-steps associated with closing a case, according to some embodiments. A case, such as the representative case 132, may have associated case data 202. The case data 202 may include information about the case such as, for example, a case number 204, a current step 206, an owner 208, an issue type 210, a priority 212, and a contract 214. The case number 204 may be an alphanumeric number assigned to the case 132 to uniquely identify the case 132 from other cases. The current step 206 may indicate at what stage (e.g., a particular step and/or sub-step) the case 132 is in the current process. The owner 208 may indicate a current technician (e.g., the technician 116 of FIG. 1) to which the case 132 is assigned. The issue type 210 may indicate a type of issue determined by the technician based on the initial troubleshooting. For example, the issue type 210 may be software, hardware, firmware, or any combination thereof.

The priority 212 may indicate a priority level associated with the case 132. For example, if the user is a consumer that has paid for a higher-level support plan or a higher-level warranty or if the user is part of an enterprise that is one of the top customers (e.g., buying hundreds of thousands of dollars' worth of products and support each year) of the computer manufacturer and has purchased a high level support plan, then the priority 212 may be higher compared to other users. As another example, if the time to resolve the case 132 has exceeded a particular threshold, then the priority 212 may be automatically escalated to a next higher priority level to maintain or increase customer satisfaction. The contract 214 may indicate a current warranty contract between the user and the manufacturer. For example, the contract 214 may indicate that the contract is a standard contract provided to a purchaser of the computing device. As another example, the contract 214 may indicate that the contract is a higher-level warranty (e.g., Support Pro, Silver, or the like) or a highest-level warranty (e.g., Support Pro Plus, Gold, or the like).

The process to close the case 132 may include multiple steps, such as a step 214(1) (e.g., troubleshooting), a step 214(2) (e.g., create a work order (W.O.)), a step 214(3) (e.g., parts execution), to a step 214(N) (e.g., labor execution, N>0). One or more of the steps 214 may include one or more sub-steps. For example, as illustrated in FIG. 2, the step 214(1) may include sub-steps 216(1) (e.g., dispatch part(s)), 216(2) (e.g., receive inbound communication), 216(3) (e.g., escalate to a higher-level technician or to a manager), 216(4) (e.g., customer responsiveness), 216(5) (e.g., change in ownership), to 216(M) (e.g., customer satisfaction, M>0). Of course, other steps of the steps 214 may also include sub-steps. The steps 214 may correspond to the steps 134 of FIG. 1. The length 218 may indicate a length of time to complete each step. For example, a length 218(1) may indicate a length of time to complete the step 214(1), a length 218(2) may indicate a length of time to complete the step 214(2), a length 218(3) may indicate a length of time to complete the step 214(3), and a length 218(N) may indicate a length of time to complete the step 214(N) (N>0). A length 220(1) may indicate a length of time to complete the sub-step 216(1), a length 220(2) may indicate a length of time to complete the sub-step 216(2), a length 220(3) may indicate a length of time to complete the sub-step 216(3), and a length 220(M) may indicate a length of time to complete the sub-step 216(M) (M>0, M not necessarily equal to N).

Figure 3:
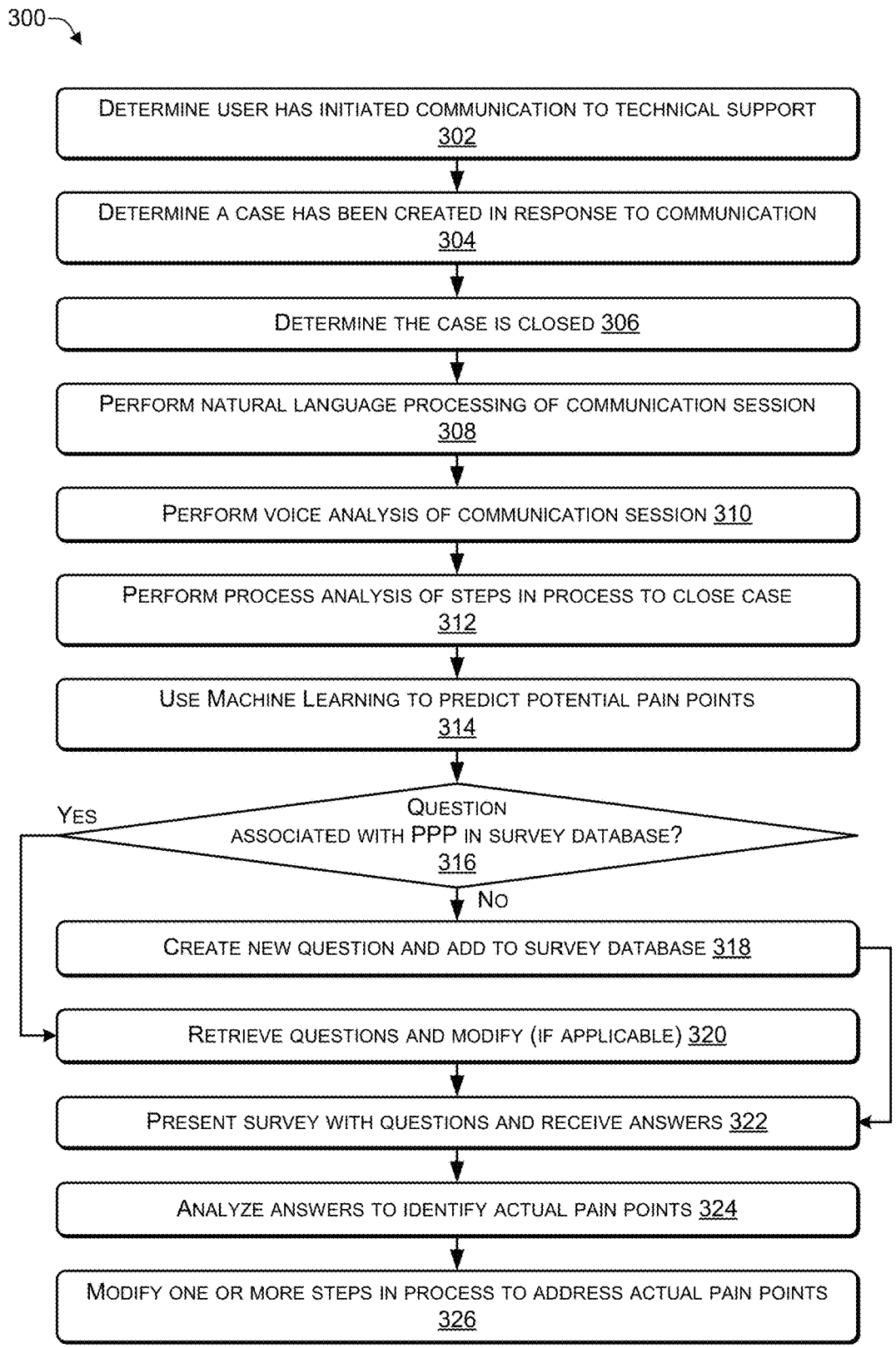
FIG. 3 is a flowchart of a process that includes using machine learning to predict potential pain points in a process to resolve an issue, according to some embodiments.
Figure 4:
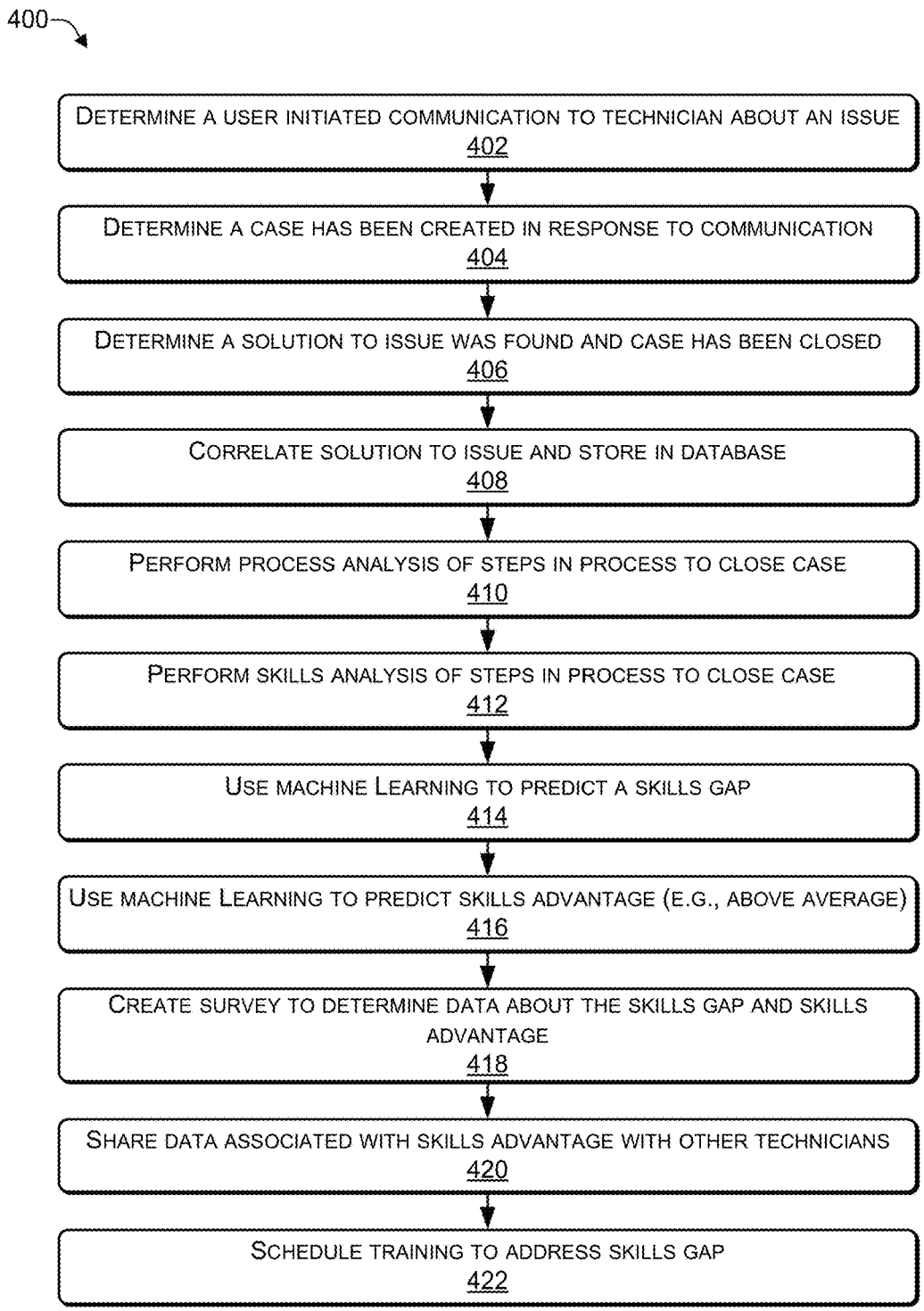
FIG. 4 is a flowchart of a process that includes using machine learning to predict a skill level corresponding to each of multiple skills associated with a technician, according to some embodiments.
Figure 5:
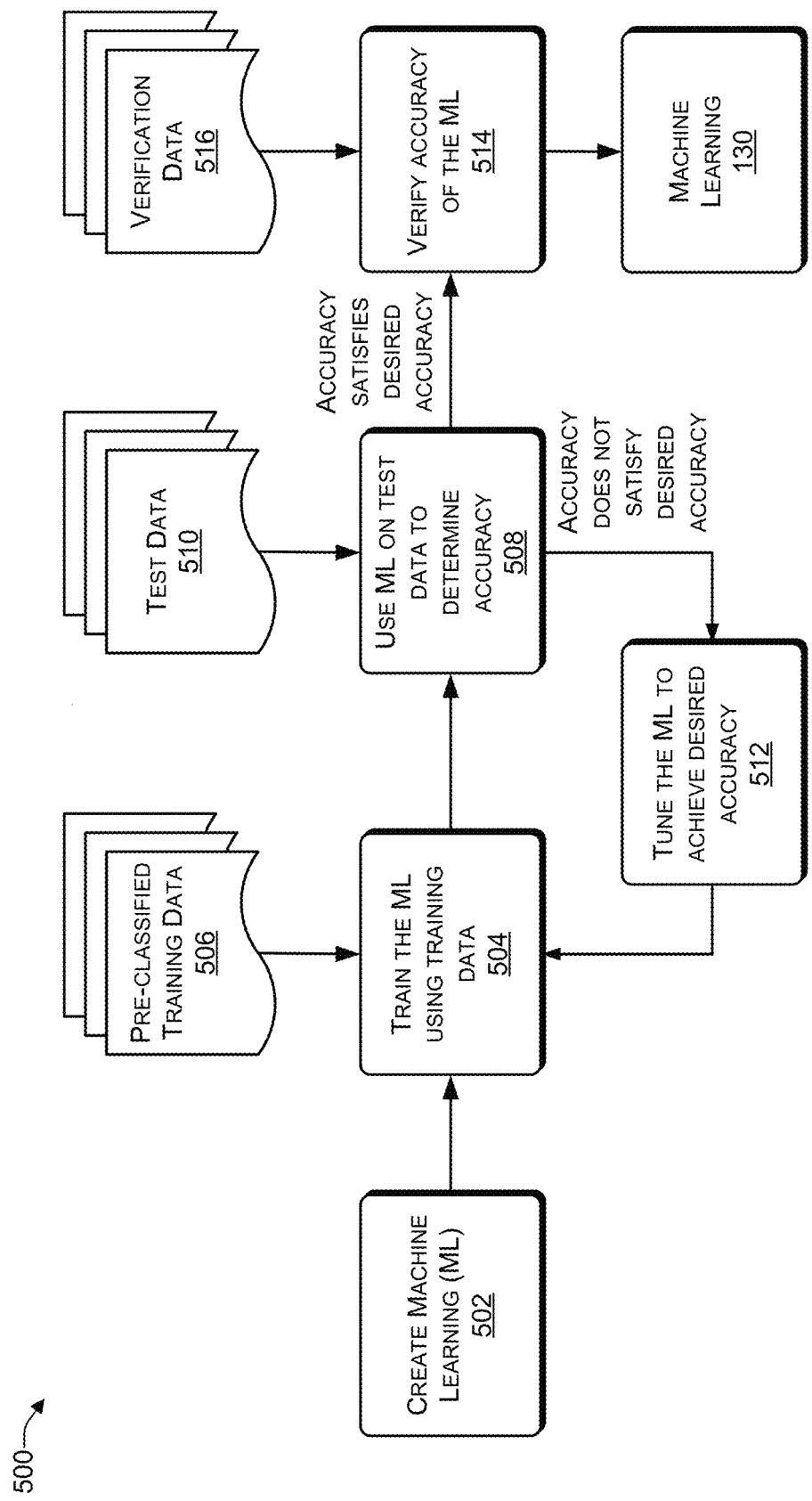
FIG. 5 is a flowchart of a process to train a machine learning algorithm, according to some embodiments.

In the flow diagrams of FIGS. 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400 and 500 are described with reference to FIGS. 1 and 2 as described above, although other models, frameworks, systems and environments may be used to implement this process.

FIG. 3 is a flowchart of a process 300 that includes using machine learning to predict potential pain points in a process to resolve an issue, according to some embodiments. The process 300 may be performed by a server, such as the server 104 of FIG. 1.

At 302, the process may determine that a user (of a computing device) has initiated communication to a technical support group (of a manufacturer of the computing device). At 304, the process may determine that a case has been created in response to the communication. At 306, the process may determine that the case is closed. For example, in FIG. 1, the server 104 may receive the communication 150 from the user 160 indicating an issue with the computing device 102. In response, the server 104 may connect the user 160 to the technician 116 and the technician 116 may provide the response 152. The technician 116 may create the case 132 associated with the issue with the computing device 102. The communication session 154 may include multiple responses 152 from the technician 116 and multiple communications 150 from the user 160. For example, in the communication session 154, the technician 116 may ask the user 160 to provide information about the computing device 102 and the issue being experienced. The technician 116 may ask the user 160 to perform various actions, such as installing and/or uninstalling a software application (e.g., operating system, driver, firmware, software application, or the like), performing a restart, describing what the computing device 102 is displaying, and the like. In some cases, the technician 116 may electronically connect directly to the computing device 102 and perform one or more actions to address the issue. After the technician 116 has successfully resolved the issue, the technician 116 may close the case 132.

At 308, the process may perform natural language processing of the communication session. At 310, the process may perform voice analysis of the communication session. At 312, the process may perform process analysis of steps in a process used to close the case. At 314, machine learning may be used to predict potential pain points. For example, in FIG. 1, if the communication session 154 is a video call or an audio call, the server 104 may extract the audio portion of the communication session 154 and perform natural language processing 138, including speech-to-text to extract text from the communication session 154. If the communication session 154 is in the form of one or more chat sessions, an exchange of emails, or another type of text-based communication, then the server 104 may gather the text associated with the communication session. The natural language processing 138 may determine particular words or phrases in the text that are used to indicate a potential pain point, such as the use of four-letter words or other swear words, particular nouns, particular verbs, particular adjectives, particular adverbs, or the like. The natural language processing 138 may perform a voice analysis to determine which words the user 160 emphasizes. For example, the user 160 may emphasize a particular word or phrase by speaking the particular word or phrase at a higher volume as compared to other words or phrases, speaking the particular word or phrase at a higher pitch as compared to other words or phrases, or a combination of both higher volume and higher pitch. To illustrate, particular words or phrases that are spoken at a higher volume and/or pitch may be indicative of potential pain points. The process may perform process analysis 140 to determine the length 136 corresponding to each of the steps 134 and to determine whether the length 136 was more than or less than a predetermined percentage (e.g., 5%, 10%, 15%, or the like) compared to an average length of time to complete each of the steps 134. Based on the results of the natural language processing 138, the process analysis 140, and the language analysis 142, the machine learning 130 may predict potential pain points 144 that indicate which of the steps 134 may have been potential pain points for the user 160 during the resolution of the case 132.

At 316, the process may determine whether question(s) associated with potential pain point(s) are already in a survey question database. If the process determines, at 316, that "no" the question(s) associated with potential pain point(s) are not included in the survey question database, then the process may proceed to 318, to create new question(s) and add the new question(s) to the survey question database, and proceed to 322. If the process determines, at 316, that "yes" the question(s) associated with potential pain point(s) are included in the survey question database, then the process may proceed to 320 to retrieve the question(s) from the survey question database, and proceed to 322. In some cases, the question(s) may be modified based on the predicted potential pain points after being retrieved from the survey question database. For example, in FIG. 1, the machine learning 130 may determine whether a question to verify a particular potential pain point of the potential pain points 144 is included in the question database 146. For example, if a particular step of the steps 134 took 20% longer than average or the particular step caused the user 160 to be transferred multiple times between technicians, then a question to verify whether the particular step is a pain point may be included in the question database 146. In such cases, the question may be retrieved from the question database 146 and modified, as appropriate, based on the steps 134 used to close the case 132 and the potential pain points 144. For example, a question about a particular step taking longer than average may be modified to reflect the actual step of the steps 134 and that took longer than average. As another example, a question about multiple transfers may be modified to reflect the actual number of transfers that the user 160 underwent at a particular step of the steps 134. If a question, to verify whether a particular step is a pain point, is not included in the question database 146, then the machine learning 130 may create a new question and store the newly created question in the question database 146.

At 322, the process may present a survey with questions associated with the predicted potential pain points and receive answers from the user in response to presenting the survey. At 324, the process may analyze the answers to identify actual pain points. At 326, the process may modify one or more steps in the process to close a case to address the actual pain points. For example, the answers may be correlated with the potential pain points to determine the actual pain points. After the machine learning 130 has created questions to verify whether the potential pain points 144 were experiences pain points by the user 160, the questions may be included in the custom survey 148 and presented to the user 160. For example, the custom survey 148 may be presented as a web-based survey (e.g., using hypertext markup language (HTML), extended markup language (XML), or the like) that is emailed to the user 160, presented on a voice call using an interactive voice response (IVR) system with speech recognition, or another type of survey presentation mechanism. The survey answers 158 provided by the user 160 to the custom survey 148 may be correlated with the potential pain points 144 to determine the actual pain points 162. For example, a particular step of the steps 134 may have taken 20% longer than average and the user 160 may indicate in the survey answers 158 that the particular step was not a pain point because the additional time spent on the particular step enabled the issue to be resolved quickly and to the user's satisfaction. As another example, the user 160 may have been transferred multiple times between multiple technicians in a particular step of the steps and the user 160 may indicate in the survey answers 158 that the particular step was not a pain point because the multiple transfers enabled the issue to be resolved quickly and to the user's satisfaction. As yet another example, the user 160 may have uttered a word or phrase at a higher volume and/or pitch indicating a potential pain point in a particular step and the user 160 may confirm in the survey answers 158 that the particular step was a pain point, even though the particular step took less time than average. In this example, the particular step may have involved the user 160 performing one or more actions to the computing device 102. To address this pain point, the particular step may be modified to have the technician 116 connect to the computing device 102 and perform the one or more actions rather than asking the user 160 to perform the one or more actions. In this way, the manufacturer of the computing device 102 is able to determine the actual pain points 162 that the user 160 experiences and address them to increase customer satisfaction with the issue resolution process.

Thus, a server may determine when a case associated with a computing device has been closed. The server may perform an analysis of the communication session associated with the case. Machine learning may be used to predict potential pain points based on the analysis of the communication session. The machine learning may be used to create a custom survey to determine or verify whether the potential pain points were experienced by the user as pain points. The user's response to the custom survey may be correlated with the potential pain points to determine the actual pain points that the user experienced. For example, some steps that were predicted to be potential pain points may, after receiving the results of the survey, be determined to not be pain points that the manufacturer need not address. Other steps that were predicted to be potential pain points may, after receiving the results of the survey, be determined to be actual pain points that the manufacturer can address to increase customer satisfaction with the issue resolution process.

FIG. 4 is a flowchart of a process 400 that includes using machine learning to predict a skill level corresponding to each of multiple skills associated with a technician, according to some embodiments. For example, the process 400 may be performed by a server, such as the server 104 of FIG. 1.

At 402, the process may determine that a user-initiated communication to a technician about an issue associated with the computing device. At 404, the process may determine that the case has been created in response to the communication. At 406, the process may determine that a solution to the issue is found and the case has been closed. For example, in FIG. 1, the user may initiate the communication 150 in response to determining that the computing device 102 has an issue. The communication 150 may create the communication session 154. While a single communication session 154 is illustrated, in some cases, the communication session 154 may include multiple communication sessions. For example, the user 160 or the technician 116 may conduct a first part of the communication session 154 and then have a gap due to waiting for the computing device 102 to restart, waiting for a part to arrive, waiting for a software application to be installed, or the like and then conduct a second part of the communication session 154 after the wait. The server 104 may determine when the issue associated with the computing device 102 has been addressed and the case 132 closed.

At 408, the solution may be correlated to the issue and stored in a database. At 410, the process may perform process analysis of steps in a process used to close the case. At 412, the process may perform a skills analysis of the steps in the process used to close the case. At 414, the process may use machine learning to predict skills gap (e.g., skills that the technician can improve upon). At 416, the process may use machine learning to predict a skills advantage (e.g., above average skills) that the technician may have as compared to other technicians. For example, in FIG. 1, the machine learning 130 may perform the skills-issue correlation 124 and the issue-solution correlation 126 based on the issue associated with the case 132, the steps 134 performed by the technician 116 to resolve the issue, and the skills involved in each of the steps 134. The server 104 may use the machine learning 132 determined that skills gap/advantage 128. For example, if the technician 116 completes a particular step of the steps 134 in a shorter than average amount of time, then the technician 116 may be predicted by the machine learning 130 to have a skills advantage for the skill involved in the particular step. If the technician 116 completes a particular step of the steps 134 in a longer than average amount of time, then the technician 116 may be predicted by the machine learning 130 to have a skills gap for the skill involved in the particular step.

At 418, the process may create a survey to determine data associated with the skills gap and the skills advantage. At 420, the process may share data associated with the skills advantage of the technician with other technicians. At 422, the process may automatically schedule training for the technician to address the skills gap. For example, in FIG. 1, if the machine learning 130 determines that the technician 116 has a skills gap, then the machine learning 130 may create one or more technician survey questions to determine more details around why the technician 116 took longer than average to perform the particular step. Based on the response to the technician survey questions, the server 104 may automatically schedule training for the technician 116 to address the skills gap. If the machine learning 130 determines that the technician 116 has a skills advantage, then the machine learning 130 may create one or more technician survey questions to determine how the technician completed the particular step faster than average (e.g., what techniques the technician used). The response to the technician survey questions identifying the techniques the technician used to complete the particular step faster than average may be shared with other technicians to enable the other technicians to perform the particular step faster.

FIG. 5 is a flowchart of a process 500 to train a machine learning algorithm, according to some embodiments. The process 500 may be performed by the server 104 of FIG. 1.

At 502, the machine learning algorithm (e.g., software code) may be created by one or more software designers. At 504, the machine learning algorithm may be trained using pre-classified training data 506. For example, the training data 506 may have been pre-classified by humans, by machine learning, or a combination of both. After the machine learning has been trained using the pre-classified training data 506, the machine learning may be tested, at 508, using test data 510 to determine an accuracy of the machine learning. For example, in the case of a classifier (e.g., support vector machine), the accuracy of the classification may be determined using the test data 510.

If an accuracy of the machine learning does not satisfy a desired accuracy (e.g., 95%, 98%, 99% accurate), at 508, then the machine learning code may be tuned, at 512, to achieve the desired accuracy. For example, at 512, the software designers may modify the machine learning software code to improve the accuracy of the machine learning algorithm. After the machine learning has been tuned, at 512, the machine learning may be retrained, at 504, using the pre-classified training data 506. In this way, 504, 508, 512 may be repeated until the machine learning is able to classify the test data 510 with the desired accuracy.

After determining, at 508, that an accuracy of the machine learning satisfies the desired accuracy, the process may proceed to 514, where verification data for 16 may be used to verify an accuracy of the machine learning. After the accuracy of the machine learning is verified, at 514, the machine learning 130, which has been trained to provide a particular level of accuracy may be used.

The process 500 may be used to train each of multiple machine learning algorithms. For example, in FIG. 1, a first machine learning may be used to determine the potential pain points 144, a second machine learning may be used to create the custom survey 148, a third machine learning may be used to determine the skills gap/advantage 128, and so on.

Figure 6:
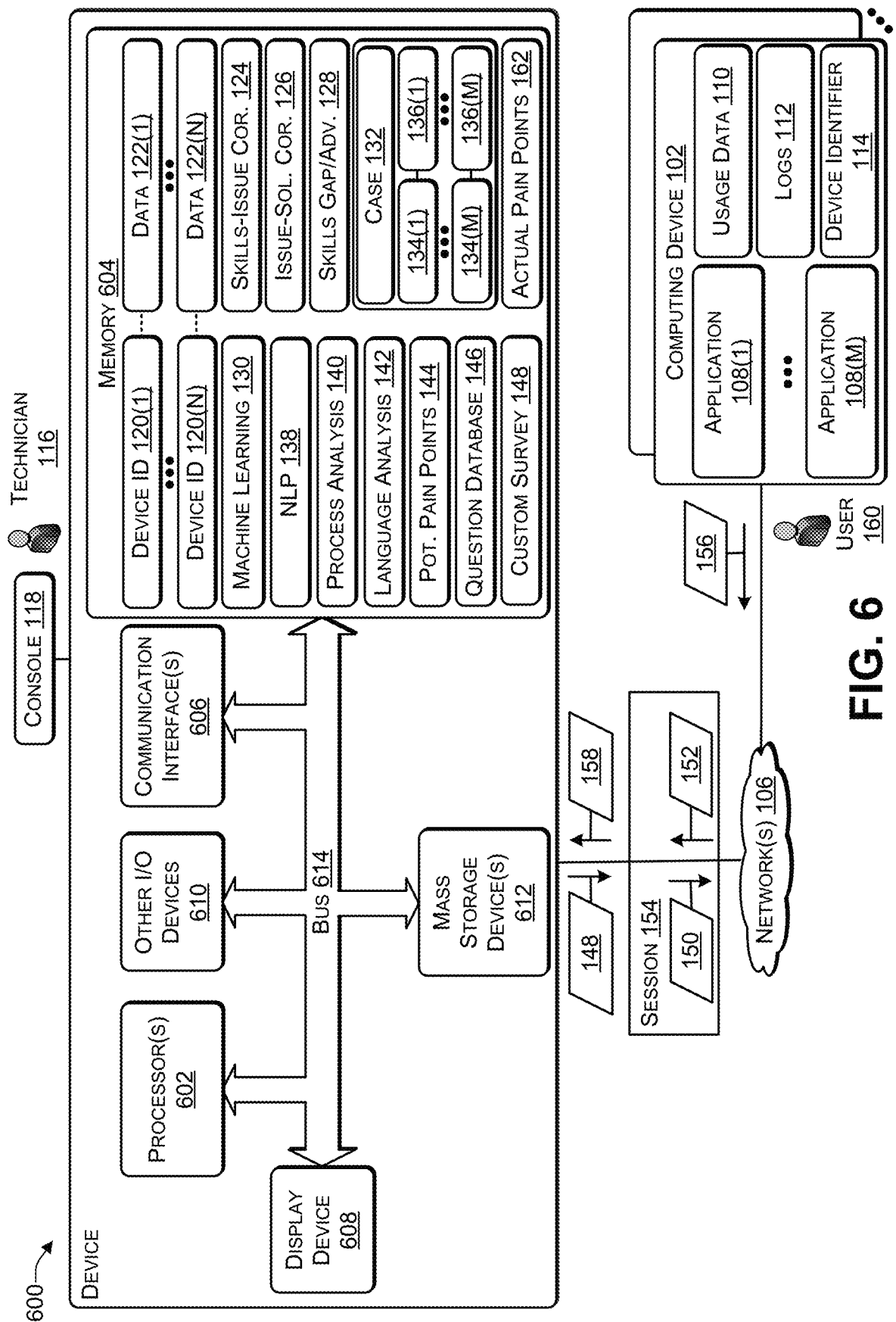
FIG. 6 illustrates an example configuration of a computing device that can be used to implement the systems and techniques described herein.

FIG. 6 illustrates an example configuration of a device 600 that can be used to implement the systems and techniques described herein, such as for example, the computing devices 102 and/or the server 104 of FIG. 1. As an example, the device 600 is illustrated in FIG. 6 as implementing the server 104 of FIG. 1.

The device 600 may include one or more processors 602 (e.g., CPU, GPU, or the like), a memory 604, communication interfaces 606, a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The device 600 may include one or more communication interfaces 606 for exchanging data via the network 110. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 116 and mass storage devices 612, may be used to store software and data. For example, the computer storage media may be used to store the data 122 associated with a corresponding device identifier 120, the machine learning 130, the NLP 138, the process analysis 140, and the like.

Thus, when the user 160 encounters an issue with the computing device 102, the user 160 may initiate a communication session 154 with a technician 116 that is part of a technical support group of a manufacturer of the computing device 102. The technician 116 may create the case 132 and perform steps 134 to resolve the issue and close the case 132. The server 104 of FIG. 1 (e.g., the device 600) may determine that the case 132, created to address an issue associated with the computing device 102, is closed. The server may perform natural language processing analysis 138 of the communication session 154 between the user 160 and the technician 116. For example, the communication session 154 between the user of the computing device and the technician may include one of: a video call, an audio call, or a chat session. The natural language processing analysis 138 may include, based on determining that the communication session comprises a voice call or a video call, converting an audio portion of the communication session into text (e.g., speech-to-text), parsing the text corresponding to the communication session to determine parts of speech associated individual words in the text, performing stemming of the individual words in the text, performing lemmatization of the individual words in the text, performing disambiguation of the individual words in the text, determining, using the machine learning algorithm, at least one pain word, and determining, based on particular steps of the process in which the at least one pain word was spoken, at least one pain point. Based on determining that the communication session comprises a voice call or a video call, the operations may include extracting an audio portion of the communication session, performing a pitch analysis of a pitch associated with which each word is spoken in the audio portion of the communication session, performing a volume analysis of a volume at which each word is spoken in the audio portion of the communication session, determining, based at least in part on the pitch analysis and the volume analysis, at least one pain word, and determining, based on particular steps of the process in which the at least one pain word was spoken, at least one pain point.

The server may perform the process analysis 140 of a process that includes the steps 134 used to close the case 132. The server may determine the length of time 136 corresponding to individual steps 134 in the process used to close the case 132. The server may use the machine learning algorithm 130 to predict, based at least in part on the natural language processing analysis 138, the process analysis 140, and the length of time 136 corresponding to the individual steps 134, potential pain points 144 associated with the communication session 154. A potential pain point may be any step (or sub-step) in the process used to close the case 132 that may cause the user 160 to experience "pain" (e.g., discomfort) and cause customer dissatisfaction. For example, a step that takes longer than average, a step in which the user is transferred multiple times between technicians, or the like, may be predicted to be potential pain points. The server may create one or more questions to include in the custom survey 148 and present the custom survey 148 to the user 160. For example, the server may create the one or more questions to include in the custom survey 148 by determining that the survey question database 146 includes a particular question associated with a particular potential pain point of the potential pain points 144, retrieving the particular question from the survey question database 146, modifying the particular question based at least in part on the process used to close the case 132 to create a modified question, and including the modified question in the custom survey 148. As another example, creating the one or more questions to include in the custom survey 148 may include determining that the survey question database 146 does not include the particular question associated with the particular potential pain point of the potential pain points 144, creating the particular question based at least in part on the particular potential pain point, adding the particular question to the survey question database 146, and including the particular question in the custom survey 148. Presenting the custom survey 148 to the user may include either (i) presenting a web-based survey to the user or (ii) presenting an interactive voice response (IVR) based survey to the user 160. The server may receive survey answers 158 after presenting the custom survey 148. The server may correlate the survey answers 158 with the potential paint points 144 to determine the actual pain points 162 associated with closing the case 132. For example, the survey may determine that a potential pain point, such as a step taking longer than average or the user being transferred multiple times between technicians, is not an actual pain point for the user because the step led to the issue being quickly resolved. The server may determine one or more techniques to address at least one of the actual pain points 162. For example, if the technician 116 is taking too long to complete a particular step (or sub-step), then the technician 116 may be provided with additional training. As another example, if a particular step results in a user being transferred too many times between technicians, the entire process may be revamped, the responsibilities of the different technicians (e.g., first level technician, second level technician, and the like) may be broadened, a case may be automatically escalated to a higher priority, or any combination thereof, to reduce the number of transfers. The machine learning algorithm 130 may be retrained based at least in part on (i) the potential pain points 144 and (ii) the actual pain points 162.

The server may perform a skills analysis of the technician 116 including: (i) determining a skills gap (part of the skills gap/advantage 128) set of steps in the process to close the case 132, wherein each step in the skills gap set of steps took an above average length 136 to perform and is one of the actual pain points 162 and (ii) determining a skills advantage (part of the skills gap/advantage 128) set of steps in the process to close the case 132, wherein each step in the skills advantage set of steps took a below average length 136 of time to perform and is not one of the actual pain point 162s. The average amount of time may be determined based on averaging the time taken by each of multiple technicians associated with the manufacturer of the computing device to complete each step in the process to close a case. The server may schedule training for the technician to address the skills gap set. The machine learning 130 may be used to create a custom technician survey 148 based at least in part on the skills gap/advantage 128, determine, based on the technician's response to the custom technician survey 148, a particular technique that the technician 116 used to perform at least one particular step in the skills advantage set of steps, and share the particular technique with other technicians to enable the other technicians to perform the at least one particular step in the below average amount of time. For example, if the technician 116 is able to perform a particular step of the steps 134 faster than average (e.g., faster by at least a predetermined percentage, such as 10%, 15%, 20% or the like), then the survey may ask the technician to identify the "tips and tricks", e.g., the techniques the technician uses to perform the particular step faster than average and these techniques may be shared with other technicians.

Figure 7:
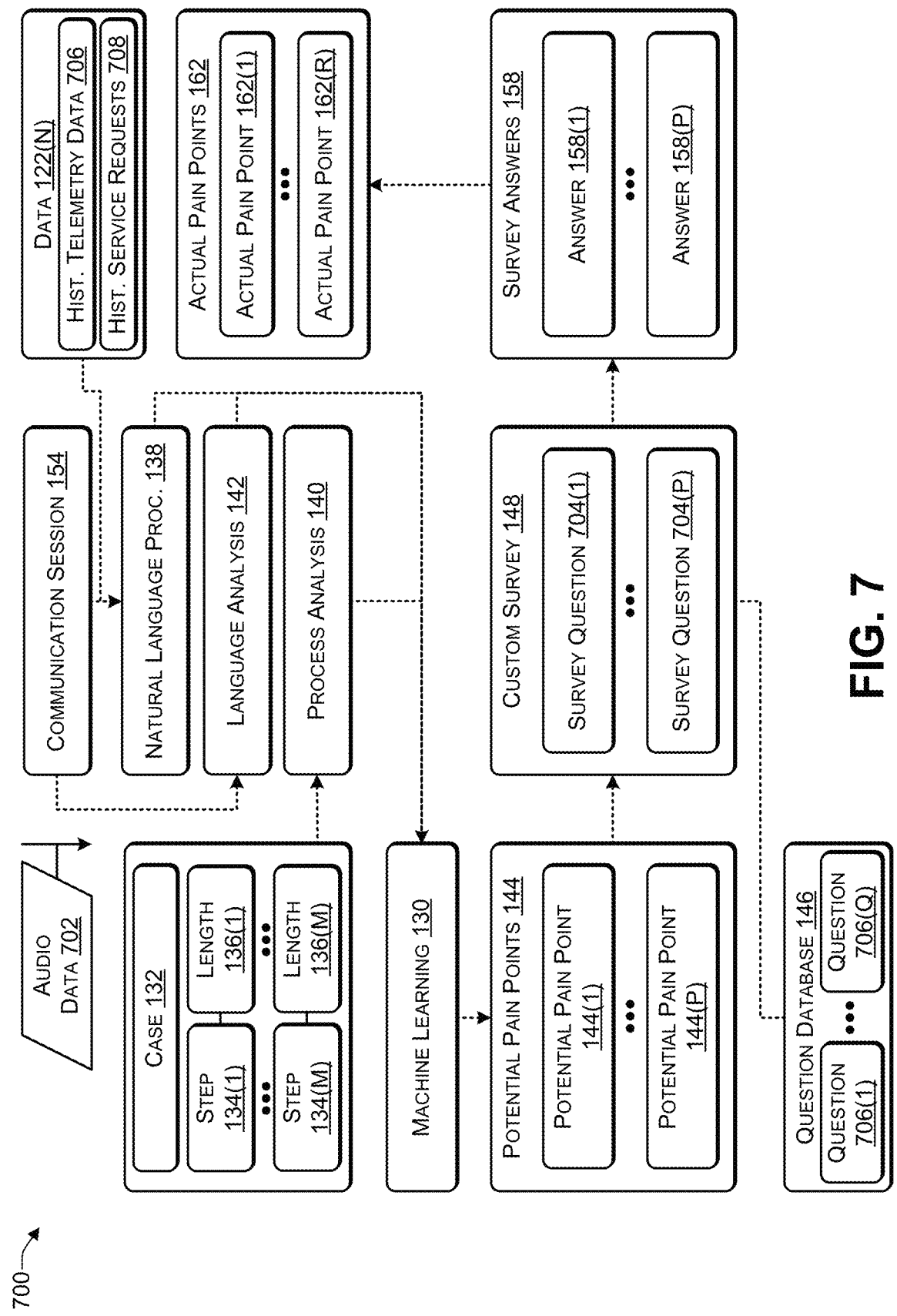
FIG. 7 is a block diagram illustrating correlating survey answers with potential pain points to determine actual pain points, according to some embodiments.

FIG. 7 is a block diagram 700 illustrating correlating survey answers with potential pain points to determine actual pain points, according to some embodiments. After the case 132 has been closed, if the communication session 154 is either an audio call or a video call, then audio data 702 may be extracted from the communication session 154 and processed using the natural language processing 138 and the language analysis 142. The natural language processing 138 and the language analysis 142 may convert the audio data 702 into text data. If the communication session 154 is in the form of one or more chat sessions (e.g., Zendesk), an exchange of emails, or another type of text-based communication, then the text from the communication session 154 may be extracted. In some cases, historical telemetry data 706 and historical service request data 708 (e.g., data from previous cases associated with the computing device 102) may be extracted. In addition, a userid of the user 160 may be used to scan and extract text from social media postings posted by the user 160. For example, the manufacturer of the computing device 102 may operate a social media site (e.g., forums) to enable users, such as the user 160, to post questions and receive answers from other users or technicians. The userid of the user 160 may be used to identify recent postings on the social media site of the manufacturer and extract text.

The natural language processing 138 and the language analysis 142 may analyze the text data from the communication session 154, the historical telemetry data 706 (e.g., previously received telemetry data), the historical service requests 708 (e.g., data associated with previous cases), and, in some cases, social media postings to identify parts of speech to determine words (e.g., words expressing frustration) indicative of a potential pain point. In addition, the natural language processing 138 may analyze the audio data 702 to identify words or phrases that are spoken with a higher volume, a higher pitch, or both as compared to other words in the audio data 702. Such words or phrases that are spoken with a higher volume, a higher pitch, or both may indicate potential pain points. The process analysis 140 may review the steps 134 performed to close the case 132 and determine a length of 136 corresponding to each of the steps 134. For example, steps 134 having a length that is at least a predetermined percentage above average may indicate potential pain points. The machine learning 130 may analyze and correlate the results of the natural language processing 138, the language analysis 142, and the process analysis 140. For example, if particular steps of the steps 134 have the corresponding length 136 that is a predetermined percentage above average, the user has spoken one or more words expressing frustration, the user has spoken one or more words with a higher volume and/or pitch compared to other words, or any combination thereof, then the machine learning 130 may predict a particular pain point. Thus, the machine learning 130 may predict the potential pain points 144(1) to 144(P) (P>0) based on the natural language processing 138, the language analysis 142, and the process analysis 140.

The question database 146 may include multiple questions, such as a question 706(1) to a question 706(Q) (Q>0) from previous surveys. After determining the potential pain points 144, the machine learning 130 may determine whether any of the questions 706 are related to the potential pain points 144. For example, if a particular question 706 is related to one of the potential pain points 144, then the machine learning 130 may retrieve the particular question 706 from the question database 146 and include the question 706 in the custom survey 148. In some cases, the machine learning 130 may modify the particular question 706 to make it more relevant to the potential pain point 144 and place the modified particular question in the custom survey 148. If none of the questions 706 are related to a particular one of the potential pain points 144, then the machine learning 130 may create a new survey question associated with the particular one of the potential pain points 144.

The custom survey 148 may include survey question 704(1) to survey question 704(P). Each of the survey questions 704 may be a question retrieved from the question database 146 and, in some cases modified, or a new question created by the machine learning 130. Each of the survey question 704 may correspond to a particular one of the potential pain points 144. For example, the survey question 704(1) may correspond to the potential pain point 144(1) and the survey question 704(P) may correspond to the potential pain point 144(P). The purpose of the survey question 704 may be to determine if the potential pain points 144 were in fact actual pain points. For example, the survey question 704(P) may determine whether the potential pain point 144(P) was a point in time where the user had a negative experience, such as, for example, frustration, anger, or another type of dissatisfaction. To illustrate, the survey question 704(P) may ask the user whether the potential pain point 144(P) was an actual pain point, e.g., "Did step X, which took longer than average, cause you to be dissatisfied with the troubleshooting process?", "Did step Y, in which you are transferred multiple times between different technicians, cause you to be dissatisfied with the troubleshooting process?", "During step Z, the tone of your voice indicated you may have been dissatisfied with the troubleshooting process. Were you in fact dissatisfied with step Z?", and so on.

The survey answers 158 may include an answer 158(1) corresponding to the survey questions 704(1) and an answer 158(P) corresponding to the survey question 704(P). The survey answers 158 may be correlated with the potential pain points 144 to determine the actual pain points 162. If the answer 158(P) indicates that the user was not dissatisfied during the potential pain point 144(P), then the potential pain point 144(P) may not be included in the actual pain points 162. If the answer 158(P) indicates that the user was dissatisfied during the potential pain point 144(P), then the potential pain point 144(P) may be included in the actual pain points 162(1) to 162(R) (0<=R<=P). In this way, the manufacturer may confirm which of the steps 134 are actual pain points and address those to improve customer satisfaction. The manufacturer avoids spending time, effort, and money to address potential pain points that users do not experience as actual pain points.

Figure 8:
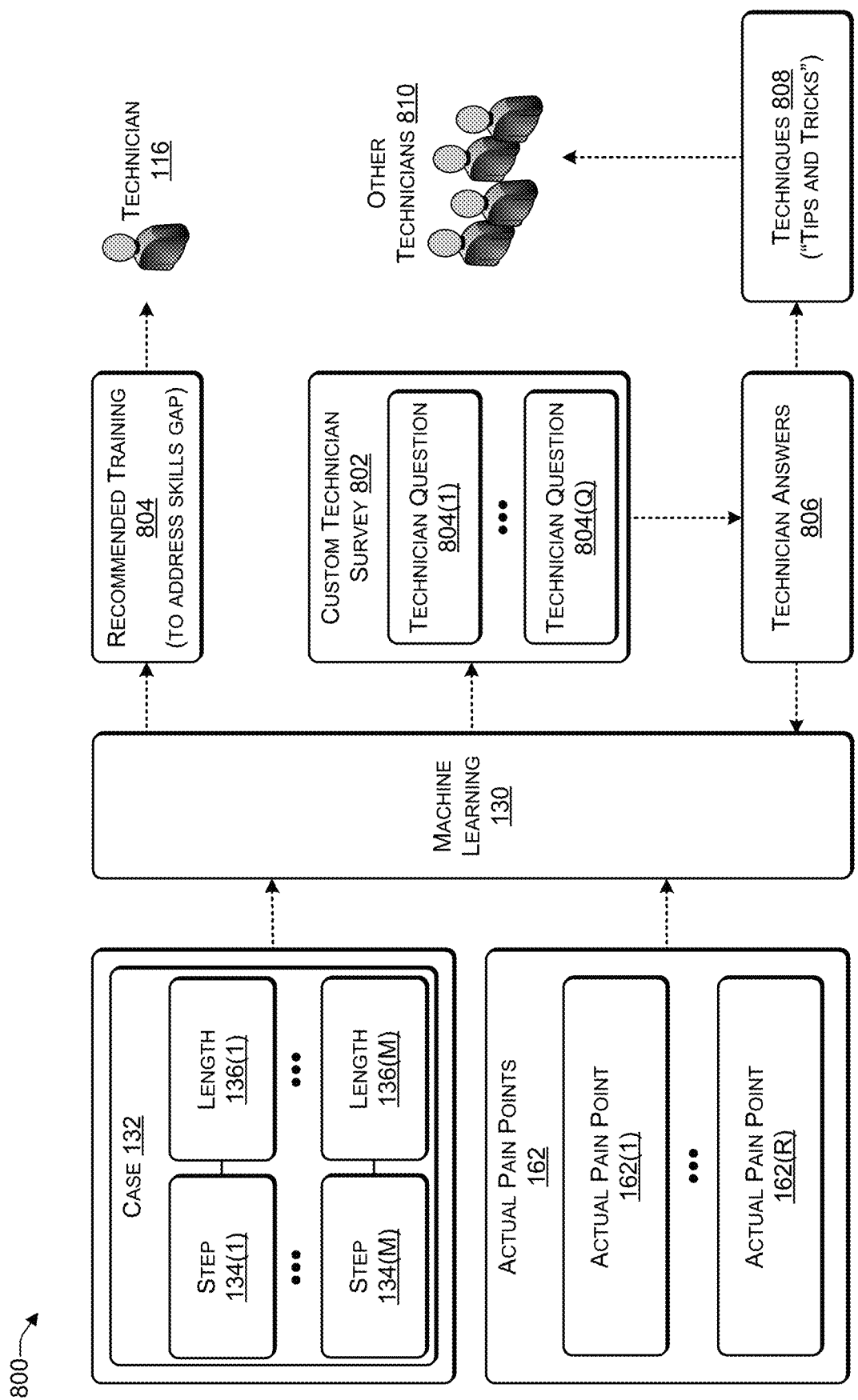
FIG. 8 is a block diagram illustrating determining a type of training to provide a technician, according to some embodiments.

FIG. 8 is a block diagram 800 illustrating determining a type of training to provide a technician, according to some embodiments. After the case 132 has been closed and the actual pain points 162 determined, the machine learning 130 may analyze the case 132 and the actual pain points 162 to create a custom technician survey 802. The custom technician survey 802 may include a technician question 804(1) to a technician question 804(Q) (Q>0). The technician questions 804 may be used to determine what actions the technician 116 did during steps where the technician 116 took either an above average length of time or a below average length of time to complete. For example, if the average length of time to perform step 134(M) is 5 minutes (=300 seconds) and the technician 116 took 6 minutes (=360 seconds), then the technician took 20% more time to perform the step 134(M). The technician questions 804 may ask the technician 116 to elaborate on what was performed during step 134(M). Technician answers 806 to the technician questions 804 may be fed into the machine learning 130 to be analyzed to determine recommended training 804 for the technician 116. If the average length of time to perform step 134(M) is 5 minutes (=300 seconds) and the technician 116 took 4 minutes (=240 seconds), then the technician took 20% less time to perform the step 134(M). The technician questions 804 may ask the technician 116 to elaborate on what was performed during step 134(M). The technician answers 806 to the technician questions 804 may identify techniques 808 (e.g., tips and tricks) that the technician 116 used to perform the step 134(M) 20% faster than the average. The techniques 808 may be shared with other technicians 810 to help them improve the speed at which they perform step 134(M).

In this way, the custom technician survey 802 may ask the technician questions 804 to determine what actions the technician 116 took at particular steps of the steps 134 that were either performed faster than average or slower than average. If the technician 116 performed a particular step faster than average, the technician questions 804 may be used to determine the techniques that the technician 116 used to perform the particular step faster than average and those techniques may be shared with other technicians 810. If the technician 116 performed a particular step slower than average, the technician questions 804 may be used to determine the actions that the technician 116 used to perform the particular step and to identify training 804 to improve an amount of time the technician 116 takes to perform the particular step.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A method comprising:
  determining, by a server associated with a technical support group, that a case created to address an issue associated with a computing device is closed;
  performing, by the server, a natural language processing analysis of a communication session between a user of the computing device and a technician;
  performing, by the server, a process analysis of a process used to close the case;
  determining, by the server, a length of time corresponding to individual steps in the process used to close the case;
  determining, using a machine learning algorithm executed by the server and based at least in part on the natural language processing analysis, the process analysis, and the length of time corresponding to individual steps, potential pain points associated with the communication session;
  creating, by the server, one or more questions to include in a custom survey, wherein the creating comprises:
    determining that a survey database does not include a particular question associated with a particular potential pain point of the potential pain points:

creating the particular question based at least in part on the particular potential pain point;
adding the particular question to the survey database; and
including the particular question in the custom survey;
presenting, by the server, the custom survey to the user;
receiving, by the server, user answers to individual questions of the one or more questions in the custom survey;
correlating, by the server, the user answers with the potential pain points to determine actual pain points associated with the communication session; and
determining, by the server, one or more techniques to address at least one of the actual pain points.

2. The method of claim 1, wherein the natural language processing analysis comprises:
based on determining that the communication session comprises a voice call or a video call, converting an audio portion of the communication session into text;
parsing the text corresponding to the communication session to determine parts of speech associated with individual words in the text;
performing stemming of the individual words in the text;
performing lemmatization of the individual words in the text;
performing disambiguation of the individual words in the text;
determining, using the machine learning algorithm, at least one pain word; and
determining, based on particular steps of the process in which the at least one pain word was spoken, at least one pain point.

3. The method of claim 1, further comprising:
based on determining that the communication session comprises a voice call or a video call, extracting an audio portion of the communication session;
performing a pitch analysis of a pitch associated with which each word is spoken in the audio portion of the communication session;
performing a volume analysis of a volume at which each word is spoken in the audio portion of the communication session;
determining, based at least in part on the pitch analysis and the volume analysis, at least one pain word; and
determining, based on particular steps of the process in which the at least one pain word was spoken, at least one pain point.

4. The method of claim 1, further comprising:
retraining the machine learning algorithm based at least in part on:
the potential pain points associated with the communication session; and
the actual pain points associated with the communication session.

5. The method of claim 1, wherein:
the communication session between the user of the computing device and the technician comprises one of:
a video call;
an audio call; or
a chat session.

6. A server comprising:
one or more processors; and
one or more non-transitory computer readable media storing instructions executable by the one or more processors to perform operations comprising:
determining that a case created to address an issue associated with a computing device is closed;
performing a natural language processing analysis of a communication session between a user of the computing device and a technician;
performing a process analysis of a process used to close the case;
determining a length of time corresponding to individual steps in the process used to close the case;
determining, using a machine learning algorithm and based at least in part on the natural language processing analysis, the process analysis, and the length of time corresponding to individual steps, potential pain points associated with the communication session;
creating one or more questions to include in a custom survey, wherein the creating comprises:
determining that a survey database does not include a particular question associated with a particular potential pain point of the potential pain points;
creating the particular question based at least in part on the particular potential pain point;
adding the particular question to the survey database; and
including the particular question in the custom survey;
presenting the custom survey to the user;
receiving user answers to individual questions of the one or more questions in the custom survey;
correlating the user answers with the potential pain points to determine actual pain points associated with the communication session; and
determining one or more techniques to address at least one of the actual pain points.

7. The server of claim 6, wherein the natural language processing analysis comprises:
based on determining that the communication session comprises a voice call or a video call, converting an audio portion of the communication session into text;
parsing the text corresponding to the communication session to determine parts of speech associated with individual words in the text;
performing stemming of the individual words in the text;
performing lemmatization of the individual words in the text;
performing disambiguation of the individual words in the text;
determining, using the machine learning algorithm, at least one pain word; and
determining, based on particular steps of the process in which the at least one pain word was spoken, at least one pain point.

8. The server of claim 6, further comprising:
based on determining that the communication session comprises a voice call or a video call, extracting an audio portion of the communication session;
performing a pitch analysis of a pitch associated with which each word is spoken in the audio portion of the communication session;
performing a volume analysis of a volume at which each word is spoken in the audio portion of the communication session;
determining, based at least in part on the pitch analysis and the volume analysis, at least one pain word; and
determining, based on particular steps of the process in which the at least one pain word was spoken, at least one pain point.

9. The server of claim 6, wherein presenting the custom survey to the user comprises one of:

presenting a web-based survey to the user; or
presenting an interactive voice response (IVR) based survey to the user.

10. One or more non-transitory computer readable media storing instructions executable by one or more processors to perform operations comprising:
    determining that a case created to address an issue associated with a computing device is closed;
    performing a natural language processing analysis of a communication session between a user of the computing device and a technician;
    performing a process analysis of a process used to close the case;
    determining a length of time corresponding to individual steps in the process used to close the case;
    determining, using a machine learning algorithm and based at least in part on the natural language processing analysis, the process analysis, and the length of time corresponding to individual steps, potential pain points associated with the communication session;
    creating one or more questions to include in a custom survey, wherein the creating comprises:
        in response to determining that a survey database includes a particular question associated with a particular potential pain point of the potential pain points:
            retrieving the particular question from the survey database;
            modifying the particular question based at least in part on the process used to close the case to create a modified question; and
            including the modified question in the custom survey; and
        in response to determining that the survey database does not include the particular question associated with the particular potential pain point of the potential pain points:
            creating the particular question based at least in part on the particular potential pain point;
            adding the particular question to the survey database; and
            including the particular question in the custom survey;
    presenting the custom survey to the user;
    receiving user answers to individual questions of the one or more questions in the custom survey;
    correlating the user answers with the potential pain points to determine actual pain points associated with the communication session; and
    determining one or more techniques to address at least one of the actual pain points.

11. The one or more non-transitory computer readable media of claim 10, wherein the natural language processing analysis comprises:
    based on determining that the communication session comprises a voice call or a video call, converting an audio portion of the communication session into text;
    parsing the text corresponding to the communication session to determine parts of speech associated with individual words in the text;
    performing stemming of the individual words in the text;
    performing lemmatization of the individual words in the text;
    performing disambiguation of the individual words in the text;
    determining, using the machine learning algorithm, at least one pain word; and
    determining, based on particular steps of the process in which the at least one pain word was spoken, at least one pain point.

12. The one or more non-transitory computer readable media of claim 10, further comprising:
    based on determining that the communication session comprises a voice call or a video call, extracting an audio portion of the communication session;
    performing a pitch analysis of a pitch associated with which each word is spoken in the audio portion of the communication session;
    performing a volume analysis of a volume at which each word is spoken in the audio portion of the communication session;
    determining, based at least in part on the pitch analysis and the volume analysis, at least one pain word; and
    determining, based on particular steps of the process in which the at least one pain word was spoken, at least one pain point.

13. The one or more non-transitory computer readable media of claim 10, further comprising:
    performing a skills analysis of the technician including:
        determining a skills gap set of steps in the process to close the case, wherein each step in the skills gap set of steps took an above average amount of time to perform and is one of the actual pain points; and
        determining a skills advantage set of steps in the process to close the case, wherein each step in the skills advantage set of steps took a below average amount of time to perform and is not one of the actual pain points.

14. The one or more non-transitory computer readable media of claim 13, further comprising:
    scheduling training for the technician to address the skills gap set.

15. The one or more non-transitory computer readable media of claim 13, further comprising:
    creating a custom technician survey based at least in part on the skills advantage set of steps;
    determining, based on the technician's response to the custom technician survey, a particular technique that the technician used to perform at least one particular step in the skills advantage set of steps; and
    sharing the particular technique with other technicians to enable the other technicians to perform the at least one particular step in the below average amount of time.

16. The method of claim 1, wherein creating the one or more questions to include in the custom survey further comprises:
    determining that a survey database includes a particular question associated with a particular potential pain point of the potential pain points;
    retrieving the particular question from the survey database;
    modifying the particular question based at least in part on the process used to close the case to create a modified question; and
    including the modified question in the custom survey.

17. The server of claim 6, wherein creating the one or more questions to include in the custom survey further comprises:
    determining that a survey database includes a particular question associated with a particular potential pain point of the potential pain points;
    retrieving the particular question from the survey database;

modifying the particular question based at least in part on the process used to close the case to create a modified question; and including the modified question in the custom survey.

18. The method of claim 1, wherein presenting the custom survey to the user comprises one of:
    presenting a web-based survey to the user; or
    presenting an interactive voice response (IVR) based survey to the user.

19. The server of claim 6, further comprising:
    retraining the machine learning algorithm based at least in part on:
        the potential pain points associated with the communication session; and
        the actual pain points associated with the communication session.

20. The one or more non-transitory computer readable media of claim 10, further comprising:
    retraining the machine learning algorithm based at least in part on:
        the potential pain points associated with the communication session; and
        the actual pain points associated with the communication session.

* * * * *